United States Patent [19]

Engelsmann et al.

[11] 4,380,382

[45] Apr. 19, 1983

[54] FILM CASSETTE FOR A PHOTOSENSITIVE FILM STRIP

[75] Inventors: Dieter Engelsmann, Unterhaching; Franz Hoffacker, Langenfeld; Guido Kovacic, Unkel; Peter Lermann, Naring; Hermann Lührig, Leverkusen; Karl Wagner, Munich, all of Fed. Rep. of Germany

[73] Assignee: Agfa-Gevaert Aktiengesellschaft, Leverkusen, Fed. Rep. of Germany

[21] Appl. No.: 274,555

[22] Filed: Jun. 17, 1981

[30] Foreign Application Priority Data

Jun. 25, 1980 [DE] Fed. Rep. of Germany ....... 3023819

[51] Int. Cl.³ .......................................... G03B 17/26
[52] U.S. Cl. .................................................. 354/275
[58] Field of Search ............................. 354/275–277, 354/283; 250/171, 184; 206/455

[56] References Cited

U.S. PATENT DOCUMENTS 2,494,740 1/1950 Boucher .............................. 378/184
3,119,015 1/1964 Kollock .............................. 378/184
4,340,288 7/1982 Stemme et al. ................. 354/275 X Primary Examiner—John Gonzales
Attorney, Agent, or Firm—Connolly and Hutz

[57] ABSTRACT

The invention relates to a film cassette for a photosensitive film consisting of a light-proof, flat flexible case substantially equal in length to the strip of film and a cassette opening which extends perpendicularly of the length of the case and which is provided with light-sealing means whereby the top part and the bottom part of the cassette being fixedly interconnected solely in the vicinity of the cassette opening and the other three edges are displaceable relative to one another in light proof labyrinths, even if the case is bent, the strip of film retains its freedom of movement.

7 Claims, 6 Drawing Figures

FILM CASSETTE FOR A PHOTOSENSITIVE FILM STRIP

This invention relates to a film cassette for a photosensitive film strip suitable for taking several pictures, consisting of a light-proof, flat flexible case substantially equal in length to the strip of film and a cassette opening (the so-called cassette mouth) which extends perpendicularly with respect to the length of the case and which is provided with light-sealing means for the passage of the film strip.

European patent application No. 0 014 309 A1 describes a film cassette of the type in question which is designed to be introduced into a photographic camera in the form of a flat flexible case. To prevent the case from being bent or folded on introduction into a camera and hence to prevent interference to the exit and entry of the film strip from and into the case, the cases are provided with grooves or bellows like folds extending transversely of their length about which the case deforms on bending. To prevent the strip of film from knocking against the folds or grooves, slide paths projecting into the cases have to be provided. In another embodiment, the flat walls of the case are designed to bulge or stretch to prevent sharp bends in the cases on deformation. In this case, spacers are introduced laterally into the case. In the event of tight bending, however, there is a danger in this known embodiment that the strip of film will jam, giving rise to problems so far as introduction and removal of the film strip are concerned.

An object of the present invention is to improve and simplify a film cassette of this type to the extent that, in the event of curved arrangement of the cassette in a camera, the probalility that, if the film strip is partly removed, the flat sides of the cassettes will rest on one another or even form kinks, preventing the strip of film from being re-inserted into the cassette, is further reduced.

According to the invention, this object is achieved in that the case consists of a top part and a bottom part, the top part and the bottom part being fixedly interconnected solely in the vicinity of the cassette opening and the top part being surrounded by the bottom part and arranged for displacement therein in such a way that light-proof labyrinths are formed at the three edges of the bottom part and top part which are displaceable relative to one another and, even if the case is bent, the strip of film retains its freedom of movement.

The displaceable arrangement of the top part in the bottom part surprisingly ensures that, when the cassette is bent for insertion into the camera, no folds or kinks are formed on the top or bottom part to interfere with the removal of the film strip from and its re-insertion into the cassette.

The differences in length between the top part and the bottom part which are formed when the cassette is bent are readily compensated by the sliding of the top part in the bottom part, the impermeability of the cassette to light being obtained by providing the bottom part with the three edges surrounding the free edges of the top part.

This simple embodiment does not require any folds in the top and bottom parts of the cassette to compensate for differences in length between them when the cassette is bent, nor hence any slide paths which have to be additionally introduced into the cassette to guide the strip of film past the folds.

In one advantageous embodiment of the cassette, the free edges of the top part are bent downwards or folded through 180°, at least along the longitudinal edges towards the film to act as spacers and at the same time as an additional labyrinth. This measure not only creates the space required for removing and inserting the strip of film, it also enhances the labyrinth effect, thereby improving the impermeability of the cassette to light.

In another advantageous embodiment of the cassette, strips acting as spacers and labyrinth are provided at least along the longitudinal edges of the bottom part of the case. These strips, which are bonded or welded into the bottom part of the case, also guarantee the space required for the strip of film, in addition to which impermeability to light is improved by further deflection of the light in the labyrinth.

The spacers are arranged in such a way that the distance between them transversely of the longitudinal axis of the film strip is greater than the maximum width of the film strip and are designed in such a way that their effective thickness is greater than the maximum thickness of the film strip. This results in the formation of a film passage in which the strip of film retains its freedom of movement, even when the cassette is in use, i.e. is in its bent state.

The invention is described in more detail in the following with reference to the accompanying drawings, wherein.

Figure 1:
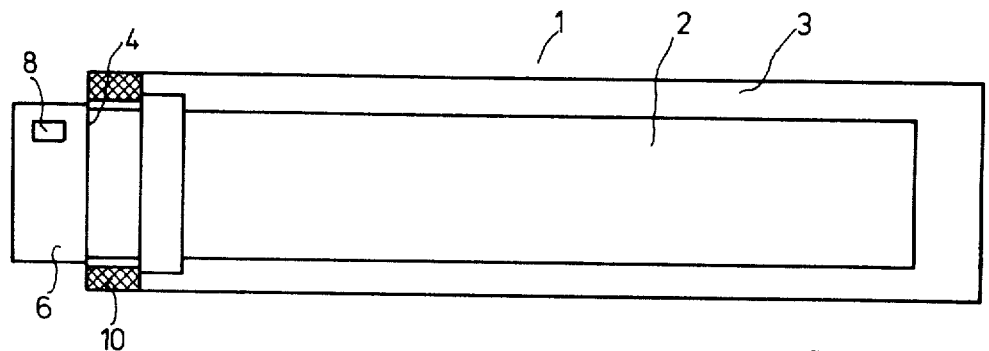
FIG. 1 is a plan view of the cassette.
Figure 2:
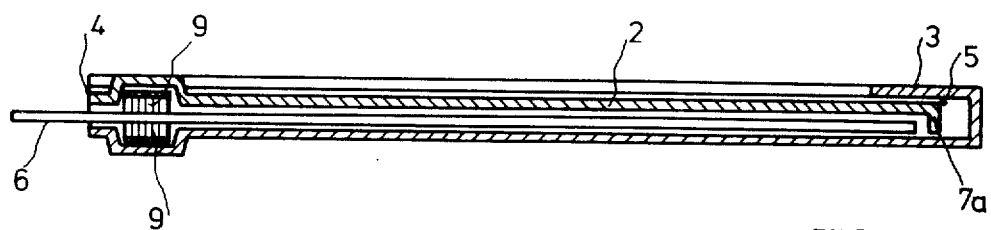
FIG. 2 is a longitudinal section through the cassette.

The film cassette shown in FIGS. 1 and 2 is formed by an elongate case 1 which is thin in comparison with its length and width and which is provided on its narrow side with an opening, preferably a slot, as the cassette mouth 4 for the passage of a strip 6 of film present in it. The film strip 6 is slightly longer than the case 1 and—per frame—comprises at least one perforation 8 along one of its longitudinal edges. In order to protect the film strip 6 accomodated inside the case against the unintentional entry of light, the cassette mouth 4 is provided with at least one light-sealing strip 9, for example, a strip of felt or plush. The beginning of the film, which projects from the case 1 so that it may be gripped, may be masked to eliminate its photoconductivity and, in addition, may be safeguard against accidental removal, for example, by means of adhesive tape.

In the illustrated embodiment, the case 1 is made of light-impermeable elastic plastics material or paper. It consists essentially of two parts, namely a bottom part 3 and a top part 2. The bottom part 3 is slightly arched near the side of the cassette mouth 4 to receive a light-sealing strip 9 and, at the other three edges, is folded over upwards and inwards to form a guide frame at its upper end.

To enable the bottom part to be readily deformed on insertion into a camera, those parts which are folded around inwards or shaped that way are kept very narrow along the long edges. The short edge of the bottom part 3 which faces the cassette mouth 4 may project further—with its folded-round part—into the cassette because it is not bent when the cassette is loaded into a camera.

The film strip 6 and the top part 2 are inserted into the bottom part 3. The top part 2 is somewhat shorter than the bottom part and, in the vicinity of the cassette mouth 4, is also arched to receive a light-sealing strip 9.

The top part 2 and the bottom part 3 are fixedly interconnected by bonding or weldings 10 solely in the vicinity of the cassette mouth 4. The top part 2 is thus freely displaceable in the bottom part 3.

If the cassette is bent for loading into a camera, the top part slides in the bottom part commensurate with the different bending radii without any folds or kinks being formed. Even when the cassette is in its sharply bent position in a camera, the strip of film can be reinserted into the cassette without coming into contact with a fold or kink. The strip 6 of film is made easier to insert and withdraw if the space required for the film strip is kept intact by a spacer 7,8. This result may be achieved in various ways.

Figure 3:
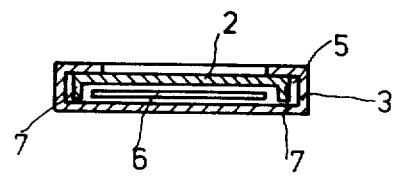
FIG. 3 is a cross-section through a cassette with a downwardly turned top part.

FIG. 3 shows an embodiment of the cassette in which the longitudinal edges of the top part 2 are bent round by somewhat more than the thickness of the film strip 6 and rest on the base of the bottom part 3. Another advantage of this embodiment is that it considerably improves impermeability to light; firstly because an additional light-sealing effect is obtained by the contact of the longitudinal edges 7 of the top part 2 with the base of the bottom part 3. By suitably selecting the height of the downwardly bent edges 7 in relation to the height of the interior of the bottom part 3, the edges 7 can be resiliently pressed on to the base of the bottom part 3. The narrow edge 7a of the top part can also be bent downwards to obtain better impermeability to light, as shown in FIG. 2.

Figure 4:
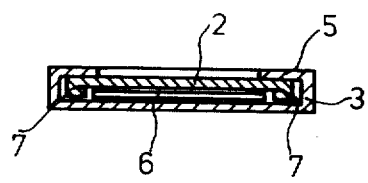
FIG. 4 is a cross-section through a cassette in which the top part has folded-round edges.

FIG. 4 shows an embodiment in which the edges 7 of the top part 2 are folded through 180° and are applied, bonded or welded to the upper part. Depending on the material used for the cassette, this embodiment, can be of advantage because it follows any deformation more easily than an edge bent downwards through 90°. In this case, however, the material used for the top part 2 has to be thicker than the film strip 6 to create space for the movement of the film strip. The advantages in terms of impermeability to light are the same as for the embodiment shown in FIG. 3.

Figure 5:
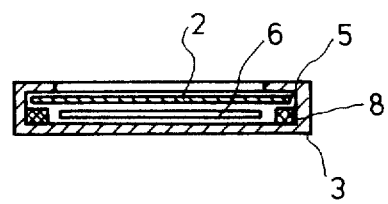
FIG. 5 is a cross-section through a cassette with additionally introduced spacers.

FIG. 5 shows an embodiment in which additional strips 8 are provided as spacers along the longitudinal edges of the bottom part 3. These strips 8 are made of a flexible material and are bonded or welded into the bottom part. Their thickness is somewhat greater than the thickness of the film strip 6 whilst their width is gauged in such a way that the guiding of the top part 2 (sheet-like in this embodiment) is adequate. The top part 2 is guided between the inwardly folded edges of the bottom part 3 and the strips 8 so that the impermeability to light is also very good because the light is repeatedly deflected in the labyrinth 5.

Figure 6:
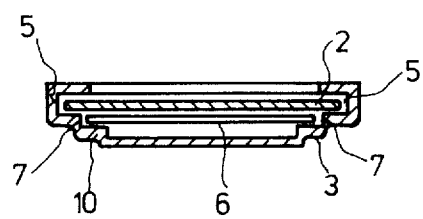
FIG. 6 is a cross-section through a cassette with spacers and a picture-free film guide.

It is often desirable or necessary that at least that side of the film strip which carries the picture or image should not come into contact with the cassette to prevent scratching, marking or other damage to the often sensitive photographic emulsion. FIG. 6 shows an embodiment of a cassette in which a labyrinth 5 for impermeability to light and guiding of the top part 2 mounted for displacement in the bottom part 3 is formed by graduations in the width of the bottom part 3, a space for the film strip 6 is obtained by spacers 7 and picture-free guiding of the film strip 6 is achieved solely by contact of the film strip 6 with the edges 10 of the longer side of the cassette. In this case, the top part 2 is very simply in the form of a sheet. The bottom part may be made of a drawn profile of an elastic plastics material or may even be an injection-moulding.

Embodiments other than those illustrated in the drawings are of course also possible. Thus, the labyrinths may be differently formed. A variety of materials, such as metal foils, plastics films or light-proof papers, may be used for making the cassette.

One feature common to all embodiments is that, inside, the cassette 1 has a space for accommodating the film strip 6. Even when the cassette 1 is bent transversely of the longitudinal direction of the flat sides of the case for loading into a camera, this space always represents a smooth, open passage for removal and reinsertion of the film strip 6.

We claim:

1. A film cassette for a photosensitive film strip suitable for taking several pictures, consisting of a light-proof, flat flexible case substantially equal in length to the strip of film and a cassette opening which extends perpendicularly of the length of the case and which is provided with light-sealing means, characterised in that the case comprises a top part and a bottom part, the top part and the bottom part being fixedly interconnected solely in the vicinity of the cassette opening and the top part being surrounded by the bottom part and arranged for displacement therein in such a way that light-proof labyrinths are formed at the three edges of the bottom part and top part which are displaceable relative to one another and, even if the case is bent, the strip of film retains its freedom of movement.

2. A film cassette as claimed in claim 1, characterised in that the free edges of the top part—at least along the longitudinal edges—are bent downwards towards the film to form spacers and, at the same time, to form a labyrinth in co-operation with the bottom part.

3. A film cassette as claimed in claim 1, characterised in that the free edges of the top part—at least along the longitudinal edges—are folded around through 180° towards the film to form spacers and to form a labyrinth in co-operation with the bottom part.

4. A film cassette as claimed in claim 1, characterised in that strips are provided at least along the longitudinal edges of the bottom part of the cases to act as spacers and to form a labyrinth in co-operation with the bottom part.

5. A film cassette as claimed in claims 2, 3 or 4, characterised in that the spacers are separated from one another transversely of the longitudinal direction by a distance which is greater than the maximum width of the film strip.

6. A film cassette as claimed in claims 2, 3 or 4, characterised in that the spacers have an effective thickness which is greater than the maximum thickness of the film strip.

7. A film cassette as claimed in claim 1, characterised in that the bottom part is made in one piece by drawing or injection moulding and, by virtue of its shape, forms a guide for the displaceable top part and, in co-operation with the top part, a labyrinth and comprises spacers and, at its sides, a film guide which enables that part of the film strip carrying the picture to be guided without contact.

* * * * *